United States Patent
Goetz et al.

(10) Patent No.: US 6,449,693 B1
(45) Date of Patent: Sep. 10, 2002

(54) METHOD AND APPARATUS FOR IMPROVING CACHING WITHIN A PROCESSOR SYSTEM

(75) Inventors: John W. Goetz, Underhill; Paul T. Gutwin, Williston; Stephen W. Mahin, Underhill; Wilbur D. Pricer, Charlotte, all of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/286,708

(22) Filed: Apr. 5, 1999

(51) Int. Cl.[7] .............................................. G06F 12/00
(52) U.S. Cl. ...................... 711/122; 711/123; 711/128
(58) Field of Search ................................. 711/122, 123, 711/125, 126, 119, 120, 128, 145

(56) References Cited

U.S. PATENT DOCUMENTS

| | | | |
|---|---|---|---|
| 4,371,929 A | 2/1983 | Brann et al. ................... 710/45 |
| 4,905,141 A | 2/1990 | Brenza ........................ 711/129 |
| 5,357,623 A | 10/1994 | Megory-Cohen ........... 711/129 |
| 5,442,747 A | 8/1995 | Chan et al. .................. 345/509 |
| 5,553,276 A | 9/1996 | Dean .......................... 713/500 |
| 5,636,110 A | 6/1997 | Lanni .......................... 363/21 |
| 5,745,778 A | 4/1998 | Alfieri ............................ 712/1 |
| 6,038,645 A * | 3/2000 | Nanda et al. ............... 711/141 |

* cited by examiner

Primary Examiner—Matthew Kim
Assistant Examiner—Matthew D. Anderson
(74) Attorney, Agent, or Firm—Schmeiser, Olsen & Watts; Mark F. Chadurjian

(57) ABSTRACT

A processor system is provided that comprises a plurality of L0 caches, a processor having a plurality of execution units, and an L1 cache for caching any data and instructions used by the processor. A portion of the execution units provided are configured so that each execution unit within the portion accesses one of the L0 caches. Each of the L0 caches is accessible by only one of the portion of the execution units, and each L0 cache caches a subset of any data used by the processor which is not cacheable by any of the other L0 caches. The processor system preferably comprises an instruction dispatcher that dispatches instructions executable by the processor and that selectively designates data as cacheable by only one of the L0 caches, preferably at dispatch time.

14 Claims, 3 Drawing Sheets

LOAD INSTRUCTION TIMING

| CYCLE | PIPE STAGE |
|---|---|
| 1 | INSTRUCTION FETCH |
| 2 | INSTRUCTION DECODE |
| 3 | LINEAR ADDRESS GENERATION |
| | INSTRUCTION DISPATCH |
| 4 | TLB LOOKUP/L0 TAG LOOKUP |
| | L0 TAG COMPARE, HIT/MISS & DATA RETURNED |
| 5 | INSTRUCTION COMPLETION (REGISTER WRITE) |

FIG. 2

METHOD AND APPARATUS FOR IMPROVING CACHING WITHIN A PROCESSOR SYSTEM

FIELD OF THE INVENTION

The present invention relates to processor systems and more specifically to a method and apparatus for improving caching within a processor system.

BACKGROUND OF THE INVENTION

Typical processor designs include an on-chip, "level-1" cache ("L1 cache") for fast access to the contents (e.g., data or instructions, hereinafter "information") of the most recently used memory locations. Many processors can access and use L1 cache contents in a single central processing unit (CPU) cycle (hereinafter "cycle") rather than in the two or more cycles required for accessing an off-chip, "level-2" cache ("L2 cache"). Access to the contents of system memory requires even more cycles.

Recent advances in semiconductor manufacturing technologies and processor design techniques have produced highly complex CPU microarchitectures coupled with large L1 caches that improve many aspects of CPU performance (e.g., processor speed). However, increased L1 cache size has rendered single-cycle L1 cache access difficult. For example, as a cache's size is increased, additional address bits from the address are required to directly access the information stored within the cache, and a larger decoder is required to decode the additional address bits. A larger decoder is inherently slower than a smaller decoder due to additional gate delays in the decode path of the larger decoder, and due to additional loading of each address line that drives an input of the larger decoder. Thus, a larger L1 cache has a longer decode time than a smaller L1 cache.

One technique for reducing the increased decode delay of a larger L1 cache is to increase the cache's associativity (e.g., the number of lines per cache row). For example, a 64 kilobyte ("K"), eight-way set associative cache with 32-byte lines stores eight 32-byte lines per cache row (e.g., in eight different "array cells") for a total of 256 bytes per cache row, and 256 cache rows per cache. Therefore, only an 8-bit address decoder (e.g., $2^8=256$) is required to access the 256 cache rows instead of an 11-bit address decoder if only one 32-byte line per cache row was employed (e.g., a "single-set" associative cache). Decode delay thereby is reduced.

While increasing cache associativity decreases decoder size, each decoder output must drive additional array cells (e.g., eight arrays cells per cache row for an 8-way set associative cache). Buffering may mitigate loading effects, but buffer circuitry itself creates additional delays. Further, once a cache row is identified via a decode operation, the cache must determine whether the identified cache row actually contains the desired information within one of the cache row's array cells, and if so, in which array cell the information resides (e.g., via tag compare and select operations). These determinations may cause additional cache access delays.

In addition to decode delays, tag compare delays and select delays, the increased physical dimensions of a large L1 cache contribute to cache access delay by increasing the cache's internal wiring lengths (e.g., increasing signal propagation times). High-performance CPUs which have large L1 caches typically employ additional, and often more complex requesters such as execution units, instruction fetch units and the like. The increased size and number of requestors that must interface a large L1 cache makes placement of the requesters near cache input and output ports difficult, increases external wiring lengths and thus further increases cache access time. Cache arbitration among multiple requesters accessing the larger L1 cache also increases cache access time.

The delays associated with larger decoders, tag compare and select operations, increased wiring lengths and cache arbitration, as well as other delays, combine to make cache access the timing bottleneck for most processor designs employing large L1 caches. Accordingly, a need exists for a method and apparatus for improving caching within a processor system by reducing the pressure on cache access time.

SUMMARY OF THE INVENTION

To overcome the needs of the prior art, an inventive processor system is provided. The inventive processor system comprises a plurality of level-0 (L0) caches, a processor having a plurality of execution units, and an L1 cache for caching any data and instructions used by the processor. The L1 cache and the L0 caches preferably are internal to the processor, although external caches may be employed. A portion of the execution units provided are configured so that each execution unit within the portion accesses one of the L0 caches. Each of the L0 caches is accessible by only one of the portion of the execution units, and each L0 cache caches a subset of any data used by the processor which is not cacheable by any of the other L0 caches.

The processor system preferably comprises an instruction dispatcher that dispatches instructions executable by the processor and that selectively designates data as cacheable by only one of the L0 caches. The designation of data as cacheable by only one of the L0 caches preferably occurs at the time instructions are dispatched by the instruction dispatcher (i.e., at dispatch time). For example, an instruction dispatch circuit may be provided that designates data as cacheable by only one of the L0 caches based on a portion of a linear address for the data.

A significant advantage of the inventive processor system is that each L0 cache is associated with (e.g., is "tightly coupled" to) only one execution unit so that L0 cache design is greatly simplified. For example, because each L0 cache is accessed by only one execution unit, arbitration for L0 cache access is not required (e.g., cache arbitration circuitry within each L0 cache is unnecessary), and cache access occurs at the fastest possible speeds (e.g., is not limited by arbitration delays). Further, because memory locations are not shared between L0 caches, L0 cache resources are maximized (e.g., all L0 cached data is non-duplicative data). The addresses assigned to the L0 caches may be assigned without regard for the current thread or task so that assigning and managing task algorithms are not required; and the small size of the L0 caches allows the L0 caches to be located near its associated execution unit (e.g., reducing wiring lengths and thus signal propagation delays).

Other objects, features and advantages of the present invention will become more fully apparent from the following detailed description of the preferred embodiments, the appended claims and the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

FIG. 2 is a pipeline timing diagram for a single-cycle load instruction within the inventive processor system of FIG. 1.

DETAILED DESCRIPTION OF THE PREFERRED EMBODIMENTS

Figure 1:
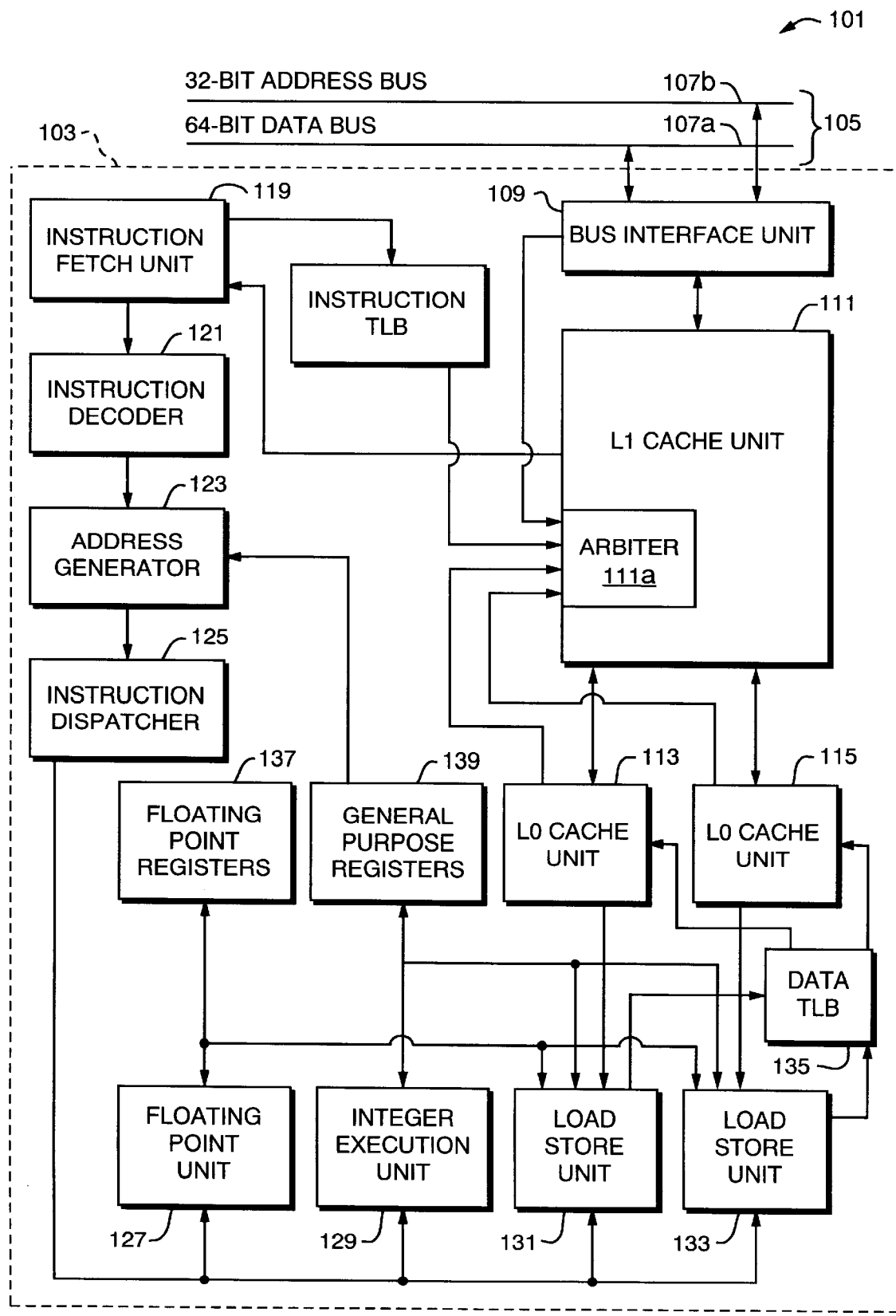
FIG. 1 is a block diagram of an inventive processor system configured in accordance with the present invention.

FIG. 1 is a block diagram of an inventive processor system 101 configured in accordance with the present invention. The inventive processor system 101 comprises a processor 103 coupled to a system bus 105 comprising a 64-bit data bus 107a and a 32-bit address bus 107b. The system bus 105 couples the processor 103 to a variety of other components such as a memory controller, an L2 cache, input/output devices and the like (not shown), and allows the processor 103 to read information from and write information to these components.

The processor 103 comprises a bus interface unit 109 coupled to the system bus 105, an L1 cache 111 coupled to the bus interface unit 109 and a first level-0 (L0) cache 113, a second L0 cache 115 and an instruction translation look-aside buffer (TLB) 117 coupled to the L1 cache 111. The L1 cache 111 stores both instructions and data and is accessed via "physical" addresses (described below). Access to the L1 cache 111 is arbitrated by an arbiter 111a internal to the L1 cache 111.

The processor 103 further comprises an instruction fetch unit 119 coupled to the L1 cache 111 and to the instruction TLB 117, an instruction decoder 121 coupled to the instruction fetch unit 119, an address generator 123 coupled to the instruction decoder 121 and an instruction dispatcher 125 coupled to the address generator 123. A floating point unit 127, an integer execution unit 129, a first load/store unit 131 and a second load/store unit 133 also are provided, and each is coupled to the instruction dispatcher 125. The first load/store unit 131 is coupled to the first L0 cache 113 and to a data TLB 135, and the second load/store unit 133 is coupled to the second L0 cache 115 and to the data TLB 135 such that the first L0 cache 113 is accessible only by the first load/store unit 131 and the second L0 cache 115 is accessible only by the second load/store unit 133.

The processor 103 further comprises floating point registers 137 coupled to the floating point unit 127, to the first load/store unit 131 and to the second load/store unit 133, and general purpose registers 139 coupled to the address generator 123, to the integer execution unit 129, to the first load/store unit 131 and to the second load/store unit 133.

In operation, the instruction fetch unit 119 requests an instruction from the L1 cache 111 by sending a virtual or "linear" address (e.g., an address into the total possible memory space of the inventive processor system 101) to the instruction TLB 117. In the inventive processor system 101 of FIG. 1, the virtual address is 32 bits for a total possible memory space of about four gibabytes. The instruction TLB 117 translates the virtual address into a physical address (e.g., an address into the physically available memory space of the inventive processor system 101) and sends the physical address and a fetch request to the L1 cache 111. The arbiter 111a arbitrates the fetch request with any requests from the bus interface unit 109, the first L0 cache 113 and the second L0 cache 115.

Assuming the requested instruction resides within the L1 cache 111, the L1 cache 111 sends the requested instruction to the instruction fetch unit 119, and the instruction fetch unit 119 passes the instruction to instruction decoder 121. In response thereto, the instruction decoder 121 identifies the type of instruction, the locations of operands required for the instruction (e.g., in memory, in a register, etc.) and the location to which to return results of executing the instruction. In the embodiment of FIG. 1, the instruction set of the processor 103 defines instructions for accessing memory (e.g., load/store instructions) that are unique from instructions for operating on data (e.g., non-memory instructions such as add, jump, etc.). It will be understood that a more complex instruction set that operates directly on memory operands may be employed with the processor 103 (e.g., by first decomposing complex instructions into load/store instructions and non-memory instructions).

If the instruction identified by the instruction decoder 121 is a load/store instruction, the instruction decoder 121 forwards the instruction to the address generator 123; otherwise, the instruction decoder 121 bypasses the address generator 123 and forwards the instruction to the instruction dispatcher 125. The address generator 123 calculates a virtual data address for any data operand associated with a load/store instruction from immediate (e.g., hard-coded) or displacement (e.g., offset) fields within the encoded instruction and/or from values held in the general purpose registers 139

The address generator 123 forwards the load/store instruction and its associated virtual data address to the instruction dispatcher 125. Thereafter, the instruction dispatcher 12S assigns the instruction either to the first load/store unit 131 or to the second load/store unit 133 and forwards the instruction thereto. Specifically, the instruction dispatcher 125 uses a bit from the virtual data address accompanying the instruction to determine which of the load/store units 131, 133 is to receive the instruction. Preferably, the bit employed to select one of the load/store units 131, 133 is programmably selectable as described below with reference to FIG. 3.

Once the instruction is forwarded to one of the load/store units 131, 133, the load/store unit receiving the instruction performs the load/store operation designated by the instruction. For example, if the instruction dispatcher 125 transfers a load instruction to the second load/store unit 133, the second load/store unit 133 executes the load instruction by first determining whether the second L0 cache 115 contains the data required for the load instruction. More specifically, the second load/store unit 133 sends the virtual data address of the data to be loaded to the data TLB 135, and the data TLB 135 translates the "page" portion of the virtual address into a "physical" page. The physical address then is forwarded to the second L0 cache 115 for cache row decoding and for use in indexing the bytes of one of the 32-byte lines via offset bits of the physical address. The tag bit portion of the physical address is used to perform a tag compare operation on the array cells of the identified cache row and, if a tag of one of the array cells matches the tag bits, the offset bits are used to identify the appropriate data byte from the 32-byte line within the array cell. Thereafter, the data byte is transferred from the second L0 cache 115 to the second load/store unit 133. The data byte then may be forwarded directly to the floating point registers 137 or to the general purpose registers 139.

If the tag compare operation fails and the second L0 cache 115 does not contain the data to be loaded (i.e., a "miss"), the second L0 cache 115 sends a request for the data to the L1 cache 111. If the L1 cache ill contains the data, the data is transferred from the L1 cache 111 to the second L0 cache 115 and from the second L0 cache 115 to the target location. However, if the L1 cache 111 does not contain the data, the L1 cache 111 sends a request for the data to the next memory level (e.g., an L2 cache, system memory, etc.). This process is repeated until the data is found.

If the instruction dispatcher 125 transfers a store instruction to one of the load/store units 131, 133, a similar operation is performed. For example, if the instruction dispatcher 125 transfers a store instruction to the second load/store unit 133, the second load/store unit 133 executes the store instruction. The contents of the second L0 cache 115 are examined to ensure that the appropriate cache row is present within the second L0 cache 115, and if not, the cache row is retrieved from another memory location (e.g., the L1 cache 111, an L2 cache, system memory, etc.). Thereafter, data is transferred from either the floating point registers 137 or the general purpose registers 139 to the second load/store unit 133, and from the second load/store unit 133 to the second L0 cache 115.

If the instruction identified by the instruction decoder 121 is a non-memory instruction, the instruction dispatcher 125 assigns the instruction to either the floating point unit 127 or the integer execution unit 129, depending on the instruction type. If more than one floating point unit or integer unit is present (not shown), the instruction dispatcher 125 may employ more sophisticated algorithms for assigning non-memory instructions to a particular floating point or integer unit, as are known in the art.

Instructions assigned to the floating point unit 127 read operands from the floating point registers 137, perform data operations on the operands and write operation results back to the floating point registers 137. L1 kewise, instructions assigned to the integer execution unit 129 read operands from the general purpose registers 139, perform data operations on the operands and write operation results back to the general purpose registers 139. The first load/store unit 131 and the second load/store unit 133 both have access to the floating point registers 137 and to the general purpose registers 139 to allow data transfer between the floating point registers 137, the general purpose registers 139 and the first L0 cache 113, and between the floating point registers 137, the general purpose registers 139 and the second L0 cache 115.

In the preferred embodiment, the L1 cache 111 is a 64K, four-way set associative cache with 32-byte lines, and each L0 cache 113, 115 is a 4K, two-way set associative cache with 32-byte lines. Other cache types (e.g., different sizes, different ways, etc.) may be employed. However, the preferred cache types allow the data TLB 135 and the first L0 cache 113 or the second L0 cache 115 to be accessed within the same CPU cycle (e.g., because no tag address bits are required to identify the desired cache row and the desired byte within each 32-byte line). The 64K cache organization for the L1 cache 111 (e.g., the size thereof) requires the use of two physical address bits to identify the desired cache row of the L1 cache 111 so that address translation by the instruction TLB 117 must occur before L1 cache access. L1 cache access thereby requires two CPU cycles. However, because the physical address must be ready prior to L1 cache access by the instruction TLB 117, fewer 32-byte lines per cache row are required (e.g., longer decode delays may be tolerated) and the L1 tag compare is greatly simplified.

A significant advantage of the inventive processor system 101 is that the first L0 cache 113 and the second L0 cache 115 are "tightly coupled" to the first load/store unit 131 and to the second load/store unit 133, respectively. That is, because the instruction dispatcher 125 dispatches instructions to the first load/store unit 131 and to the second load/store unit 133 based on address bits, no memory address contents are simultaneously held in more than one of the first L0 cache 113 and the second L0 cache 115. Accordingly, the first L0 cache 113 is accessed only by the first load/store unit 131, the second L0 cache 115 is accessed only by the second load/store unit 133 and L0 cache design is greatly simplified. For example, because each L0 cache 113, 115 is accessed by only one load/store unit, arbitration for cache access is not required (e.g., rendering cache arbitration circuitry within each L0 cache unnecessary), and cache access occurs at the fastest possible speed (e.g., cache access is not limited by arbitration delays). Coherency between the L0 caches 113, 115 is maintained by virtue of the dispatcher 125 and without the use of complex coherency circuitry.

Another advantage of the inventive processor system 101 is that the tightly coupled nature of the L0 caches 113, 115 yields the largest "logical size" for the L0 cache "pool" (e.g., the amount of non-duplicative cache memory). Assuming each L0 cache 113, 115 is a 4K cache (as preferred), because no memory address contents are simultaneously held in more than one of the first L0 cache 113 and the second L0 cache 115 (requiring coherency control), the logical size of the L0 cache pool is always 8K. If memory address contents could be simultaneously held in more than one of the first L0 cache 113 and the second L0 cache 115, the logical size of the L0 cache pool would vary between 4K and 8K, making inefficient use of L0 cache resources. Thus, the inventive processor system 101 allows maximum utilization of the L0 cache resources. Note that addresses are assigned to the first L0 cache 113 and to the second L0 cache 115 without regard for the current thread or task that is running so that algorithms for assigning and managing tasks are not required.

The use of small L0 caches allows the first L0 cache 113 to be located near the first load/store unit 131, and the second L0 cache 115 to be located near the second load/store unit 133. Wiring lengths and signal propagation times between components thereby are reduced. Accordingly, with short wiring lengths, small cache sizes and no cache arbitration, single cycle access to the first L0 cache 113 and to the second L0 cache 115 is easily achieved.

Because the first L0 cache 113 and the second L0 cache 115 are smaller than the L1 cache 111, the L0 cache pool holds less data than the L1 cache 111 and the miss rate of the L0 cache pool is higher than the miss rate of the L1 cache 111. However, due to the fast access times (e.g., higher operating frequency) of the first L0 cache 113 and the second L0 cache 115, the average access time for obtaining memory operands within the inventive processor system 101 is significantly reduced over the average access time for a conventional processor system employing only a large L1 cache. For instance, assume a conventional processor system has a 128K L1 cache with single-cycle access, a one percent L1 cache miss rate and a maximum single-cycle cache access operating frequency of 250 MHZ. If an L1 cache miss requires four CPU cycles to service (e.g., to obtain the data from another memory location such as from an L2 cache, system memory, etc.), the conventional processor system has an average memory access of 1.03 CPU cycles.

Assume further the inventive processor system 101 is employed and the L1 cache 111 is a 64K cache with two-cycle access and a three percent miss rate, and the first L0 cache 113 and the second L0 cache 115 are 4K caches each with single-cycle access and a ten percent miss rate. If an L1 cache miss requires four CPU cycles to service, the inventive processor system 101 has an average memory access of 1.16 CPU cycles. However, because the access time of the L1 cache 111 has been relaxed to two cycles and because of the design of the first L0 cache 113 and the second L0 cache 115 (as previously described), the maximum single-cycle cache access operating frequency of the inventive processor system 101 may be raised to 300 MHZ. The average memory access time for the inventive processor system 101 thereby is six percent faster than the conventional processor system's average memory access time due to the higher operating frequency of the inventive processor system 101 (despite the inventive processor system 101's higher miss rate).

FIG. 2 is a pipeline timing diagram 201 for a single-cycle load instruction within the inventive processor system 101. With reference to FIG. 2, during CPU cycle 1, the instruction fetch unit 119 fetches an instruction from the L1 cache 111 (e.g., via the instruction TLB 117 as previously described) and passes the instruction to the instruction decoder 121. Thereafter, during CPU cycle 2, the instruction decoder 121 identifies the instruction as a load instruction, identifies the location of data required for the load instruction (e.g., the memory address containing the data to be loaded) and identifies the location to which to return results of executing the load instruction (e.g., a register within the floating point registers 137 or within the general purpose registers 139). Because the instruction is a load instruction, the instruction decoder 121 forwards the instruction to the address generator 123.

During the first half of the CPU cycle 3, the address generator 123 calculates a virtual data address for the data associated with the load instruction (as described) and forwards the load instruction and the virtual data address to the instruction dispatcher 125. In response thereto, during the second half of the CPU cycle 3, the instruction dispatcher 125 assigns the load instruction either to the first load/store unit 131 or to the second load/store unit 133. The simplicity of the dispatch algorithm (described further below with reference to FIG. 3) allows the virtual data address calculation and instruction dispatch to occur in one CPU cycle.

Thereafter, during the first half of the CPU cycle 4, the load/store unit to which the load instruction is dispatched receives the load instruction from the instruction dispatcher 125 and begins execution of the load instruction. For example, if the second load/store unit 133 receives the load instruction, the second load/store unit 133 sends the virtual data address of the data to be loaded to the data TLB 135, the data TLB 135 translates the page portion of the virtual address into a physical page (i.e., the TLB lookup) and a cache row and its associated tags are identified via the remainder of the physical address (i.e., the L0 tag lookup). During the second half of the CPU cycle 4, the tag compare operation (i.e., the L0 tag compare) is performed between the tags associated with the identified cache row and the physical page to identify if the desired data is within the second L0 cache 115, hit or miss information is returned, and, if the data is present within the second L0 cache 115, the data is returned. Because of the small size and lack of arbitration required to access the L0 caches 113, 115, the data TLB lookup, the L0 tag lookup, the L0 tag compare and the hit/miss and data return may be performed within one CPU cycle. In CPU cycle 5, the load instruction is completed by writing the identified data to either the floating point registers 137 or to the general purpose registers 139.

Figure 3:
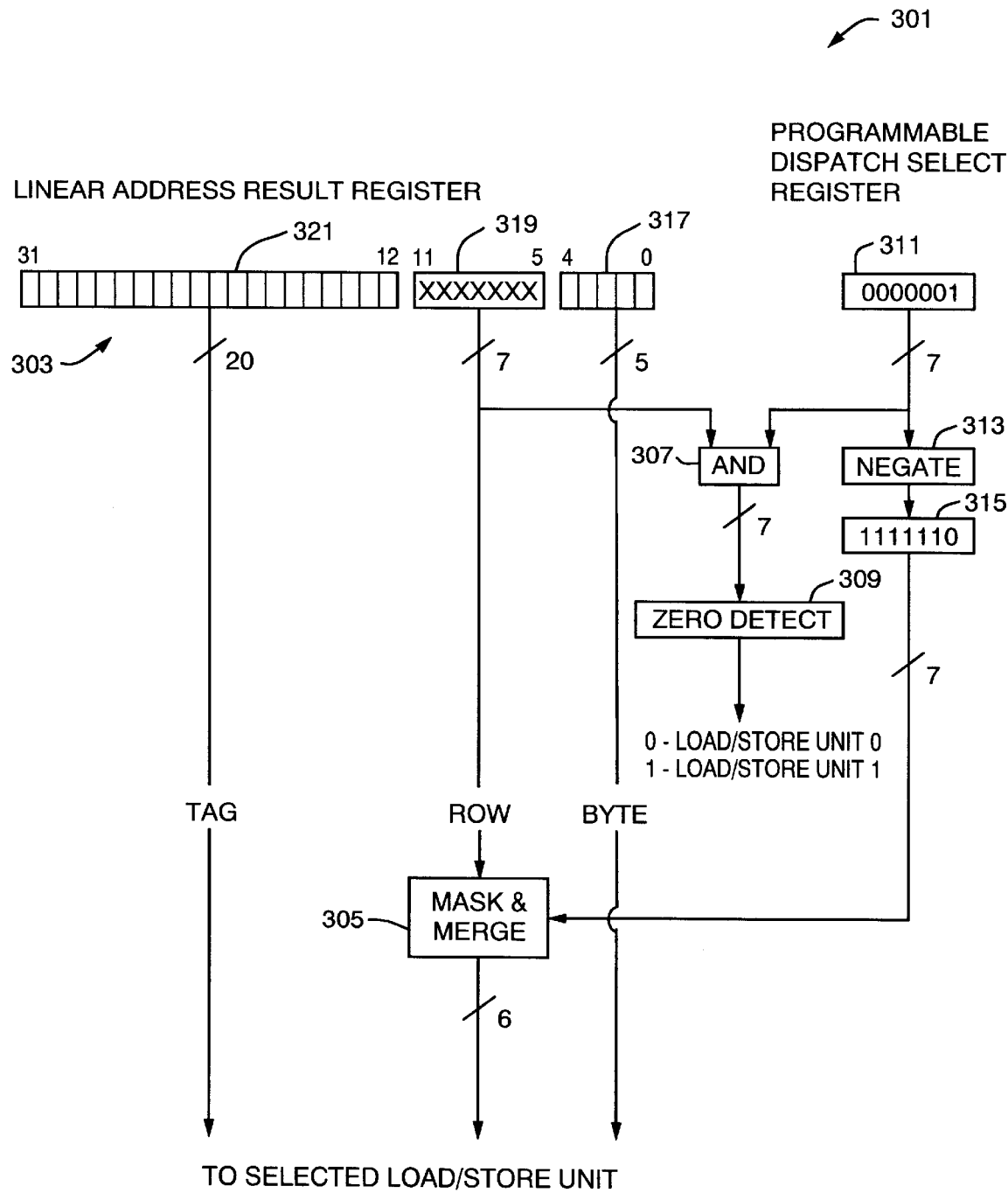
FIG. 3 is a schematic diagram of an instruction dispatch circuit for dispatching load/store instructions within the inventive processor system of FIG. 1.

FIG. 3 is a schematic diagram of an instruction dispatch circuit 301 for dispatching load/store instructions from the instruction dispatcher 125 to the first load/store unit 131 and to the second load/store unit 133. The instruction dispatch circuit 301 comprises a linear address result register 303 coupled to the first load/store unit 131 and to the second load/store unit 133 (not shown), and a mask & merge circuit 305 having a data input coupled to the linear address result register 303 and a data output coupled to the first load/store unit 131 and to the second load/store unit 133. The instruction dispatch circuit 301 further comprises an AND gate 307 having a first input coupled to the linear address result register 303, a zero detect circuit 309 having an input coupled to an output of the AND gate 307, and a programmable dispatch select register 311 coupled to a second input of the AND gate 307. A negate circuit 313 is coupled to the programmable dispatch select register 311, and a negate register 315 is coupled between the mask & merge circuit 305 and the negate circuit 313.

In operation, the linear address result register 303 stores each virtual or "linear" data address generated by the address generator 123. In the instruction dispatch circuit 301 of FIG. 3, the virtual data address comprises a 5-bit offset field 317 for accessing the bytes within a particular 32-byte line of a cache row, a 7-bit cache row field 319 for selecting one of 128 cache rows and a 20-bit virtual tag 321 (e.g., a virtual page number) which is translated by the data TLB 135 into a "physical" tag (e.g., a physical page number). The physical tag is compared to the L0 cache's tags during a tag compare operation.

For the inventive processor system 101 of FIG. 1, the instruction dispatch circuit 301 employs one of the bits within the 7-bit cache row field 319 to select which of the first load/store unit 131 and the second load/store unit 133 is to receive an instruction. However, for proper instruction dispatch, if four L0 caches are employed, 2 bits of the 7-bit cache row field 319 are required and if eight L0 caches are employed, 3 bits of the 7-bit cache row field 319 are required.

The particular bit of the 7-bit cache row field 319 that selects which L0 load/store unit 131, 133 receives an instruction is set by the programmable dispatch select register 311. To designate a particular bit of the 7-bit cache row field 319 as a "select bit", the desired bit is set to a logical one within the programmable dispatch select register 311 and all other register bits are set to a logical zero. Thus, the programmable dispatch select register 311 may be used to "tune" instruction dispatching by the instruction dispatch circuit 301 as necessary for improved cache performance.

The contents of the programmable dispatch select register 311 are ANDed with the 7-bit cache row field 319 via the AND gate 307 (e.g., each bit within the cache row field 319 is ANDed with its corresponding bit within the programmable dispatch select register 301 to produce seven AND results), and the results of the AND operations are input to the zero detect circuit 309. If the zero detect circuit 309 detects all zeros, the instruction dispatcher 125 transfers the instruction to the first load/store unit 131, and if the zero detect circuit 309 detects a one, the instruction dispatcher 125 transfers the instruction to the second load/store unit 133 (or vice-versa). In this manner, the two L0 caches 113, 115 never contain the same data, and the largest possible L0 cache pool is maintained.

As stated, the first and the second L0 caches 113, 115 preferably are 4K, two-way set associative caches with 32-byte lines per cache row. Thus, each cache requires 12 bits to access the data within the cache (e.g., $2^{12}$=4096). Five offset bits are required to access the bytes within each 32-byte line of a cache row and six bits are required to access one of the 64 cache rows within the cache. Thus, because the L0 caches 113, 115 are 4K, two-way set associative caches with 32 byte-sets, only six of the seven cache row bits of the 7-bit cache row field 319 are employed to access each cache row. The $7^{th}$ bit in this example is used to select one of the L0 caches 113, 115 during instruction dispatch.

The six bits used for cache row access must be separated from the original seven bits of the 7-bit cache row field 319 because the select bit is a programmed bit. To separate the six bits, the contents of the programmable dispatch select register 311 are negated by the negate circuit 313 and the results are stored in the negate register 315. The contents of the negate register 315 then are supplied to the mask and merge circuit 305 which masks the seven bits of the 7-bit cache row field 319 with the contents of the negate register 315 (e.g., effectively zeroing the select bit), and which merges the seven bits into six bits (e.g., the six "non-select" bits). The six bits are supplied to the first and the second L0 caches 113, 115 and serve as the cache row bits for the L0 caches 113, 115.

The foregoing description discloses only the preferred embodiments of the invention, modifications of the above disclosed apparatus and method which fall within the scope of the invention will be readily apparent to those of ordinary skill in the art. For instance, the specific type of logic gates described herein are merely preferred and any functionally equivalent logic gates may be similarly employed.

Accordingly, while the present invention has been disclosed in connection with the preferred embodiments thereof, it should be understood that other embodiments may fall within the spirit and scope of the invention, as defined by the following claims.

The invention claimed is:

1. A processor system comprising:
    an L1 cache;
    a plurality of L0 caches;
    a processor comprising a plurality of execution units, a portion of the execution units each for accessing one of the L0 caches;
    the L1 cache for caching any data and instructions to be used by the processor;
    each of the L0 caches accessible by only one of the portion of execution units, the L0 caches each for caching a subset of said any data to be used by the processor which is not cacheable by any others of the L0 caches; and
    an additional L0 cache and a requestor for accessing the additional L0 cache, the additional L0 cache capable of caching a subset of said any data to be used by the processor which is not cacheable by any others of the L0 caches and which is accessible in the additional L0 cache only by said requestor.

2. The system of claim 1 further comprising an instruction dispatcher for dispatching instructions executable by the processor and for selectively designating data as cacheable by only one of the L0 caches.

3. The system of claim 2 wherein the instruction dispatcher includes means for selectively designating the data at dispatch time.

4. The system of claim 2 wherein the dispatcher receives a linear (effective) address of data and includes means for selectively designating the data based on the linear address.

5. The system of claim 1 wherein the portion of execution units comprise load/store units.

6. The system of claim 1 wherein the L1 cache comprises a 64 k, 4-2ay set associative cache having 32-byte lines.

7. The system of claim 6 wherein each L0 cache comprises a 4 k, 2-way set associative cache having 32-byte lines.

8. A processor system comprising:
    an L1 cache;
    a plurality of L0 caches;
    a processor comprising a plurality of execution units, a portion of the execution units each for accessing one of the L0 caches;
    the L1 cache for caching any data and instructions to be used by the processor;
    each of the L0 caches accessible by only one of the portion of execution units, the L0 caches each for caching a subset of said any data to be used by the processor which is not cacheable by any others of the L0 caches; and
    an instruction dispatcher comprises an instruction dispatch circuit for designating data as cacheable by only one of the L0 caches based on a portion of a linear address for the data.

9. The system of claim 8 wherein the instruction dispatch circuit comprises a mechanism for designating data as cacheable by only one of the L0 caches based on a portion of cache line bits of the linear address for the data.

10. The system of claim 8 wherein the instruction dispatch circuit comprises a programmable dispatch select register for selecting which portion of the linear address is employed to designate data as cacheable by only one of the L0 caches.

11. The system of claim 10 wherein the instruction dispatch circuit comprises:
    an AND gate having a first input for receiving a portion of the linear address, a second input coupled to the programmable dispatch select register for receiving selection bits therefrom, and an output; and
    a zero detect circuit having an input coupled to the output of the AND gate, the zero detect circuit for outputting a first logic state if the output of the AND gate is a low voltage and for outputting a second logic state if the output of the AND gate is a high voltage;
    wherein the instruction dispatcher designates data as cacheable by a first L0 cache in response to the first logic state and designates data as cacheable by a second L0 cache in response to the second logic state.

12. The system of claim 8 further comprising a mask and merge circuit for removing at least one bit from the linear address used to designate data as cacheable by an L0 cache before the L0 cache is accessed via the linear address.

13. A method of reducing the average access time to memory operands in a processor system having an L1 cache for caching data and instructions and a plurality of execution units, the method comprising:
    providing a plurality of L0 caches;
    coupling each L0 cache to a different one of the execution units;
    providing an instruction dispatcher for dispatching instructions to the execution units and for selectively designating data as cacheable by only one of the L0 caches; and
    employing the instruction dispatcher to dispatch instructions to the execution units and to selectively designate data as cacheable by only one of the L0 caches based on a linear address of the data.

14. The method of claim 13 further comprising removing at least one bit from the linear address used to designate data as cacheable by an L0 cache before the L0 cache is accessed via the linear address.

* * * * *